United States Patent
Nakamura et al.

(10) Patent No.: US 10,824,886 B2
(45) Date of Patent: Nov. 3, 2020

(54) OCCUPANT MONITORING DEVICE FOR VEHICLE

(71) Applicant: SUBARU CORPORATION, Tokyo (JP)

(72) Inventors: Ryota Nakamura, Tokyo (JP); Kenshi Eda, Tokyo (JP); Keita Onishi, Tokyo (JP); Masayuki Marubashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/379,929

(22) Filed: Apr. 10, 2019

(65) Prior Publication Data

US 2019/0362167 A1 Nov. 28, 2019

(30) Foreign Application Priority Data

May 25, 2018 (JP) .................................. 2018-100637

(51) Int. Cl.
*G06K 9/00* (2006.01)
*H04N 5/225* (2006.01)
*G06K 9/20* (2006.01)

(52) U.S. Cl.
CPC ..... *G06K 9/00832* (2013.01); *G06K 9/00087* (2013.01); *G06K 9/2027* (2013.01); *H04N 5/2256* (2013.01)

(58) Field of Classification Search
None
See application file for complete search history.

(56) References Cited

U.S. PATENT DOCUMENTS

| | | | | |
|---|---|---|---|---|
| 2012/0044337 | A1* | 2/2012 | Mauderer | B60R 1/00 348/77 |
| 2015/0054933 | A1* | 2/2015 | Wasiek | B60R 1/12 348/77 |
| 2016/0082897 | A1* | 3/2016 | Mouser | H04N 5/2257 348/148 |
| 2016/0171320 | A1* | 6/2016 | Nagata | G06K 9/00604 348/78 |
| 2017/0210357 | A1* | 7/2017 | Nagai | B60K 28/06 |
| 2017/0264797 | A1* | 9/2017 | Trinh | B60K 35/00 |
| 2019/0188504 | A1* | 6/2019 | Aihara | G06K 9/00604 |

FOREIGN PATENT DOCUMENTS

JP 2006-134038 5/2006

* cited by examiner

*Primary Examiner* — Fernando Alcon
(74) *Attorney, Agent, or Firm* — Chip Law Group

(57) ABSTRACT

An occupant monitoring device for a vehicle in which an occupant sits on a seat provided in an occupant compartment includes an imaging device and a plurality of light projectors. The imaging device is configured to capture an image of a plurality of occupants sitting side-by-side in a vehicle width direction. The plurality of light projectors are provided in correspondence with a plurality of seat positions of the seat and are configured to project light toward the seated occupants.

20 Claims, 7 Drawing Sheets

OCCUPANT MONITORING DEVICE FOR VEHICLE

CROSS-REFERENCE TO RELATED APPLICATIONS

The present application claims priority from Japanese Patent Application No. 2018-100637 filed on May 25, 2018, the entire contents of which are hereby incorporated by reference.

BACKGROUND

The present disclosure relates to occupant monitoring devices for vehicles.

A vehicle, such as an automobile, basically accommodates a plurality of occupants including a driver that drives the vehicle.

Japanese Unexamined Patent Application Publication (JP-A) No. 2006-134038 discloses an occupant monitoring device.

SUMMARY

An aspect of the disclosure provides an occupant monitoring device for a vehicle in which an occupant sits on a seat provided in an occupant compartment. The occupant monitoring device includes an imaging device and a plurality of light projectors. The imaging device is configured to capture an image of a plurality of occupants sitting side-by-side in a vehicle width direction. The plurality of light projectors are provided in correspondence with a plurality of seat positions of the seat and are configured to project light toward the seated occupants.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
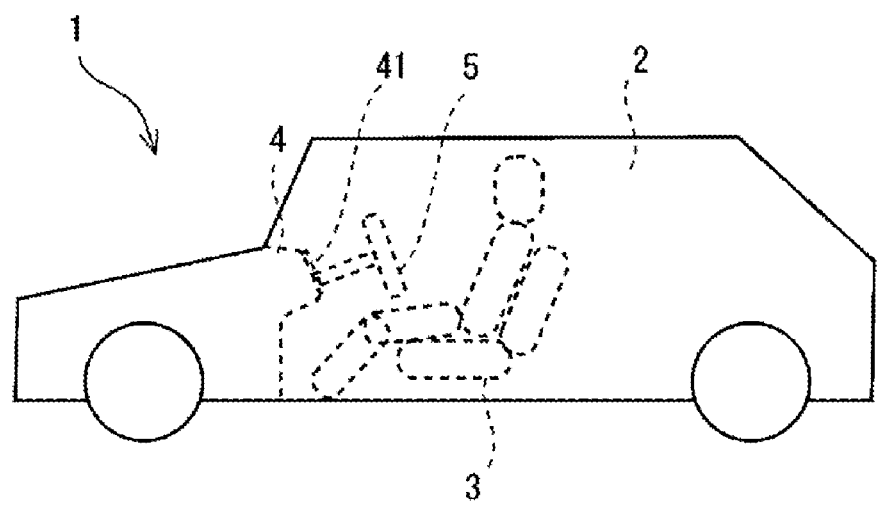
FIG. 1 illustrates an automobile to which an occupant monitoring device according to an embodiment of the disclosure is applied.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

The occupant monitoring device according to JP-A No. 2006-134038 monitors the driver alone, and an imaging device is provided to only capture an image of the driver.

Therefore, for example, if a passenger and other occupants are to be monitored in addition to the driver, the occupant monitoring device requires imaging devices equal in number to the number of people to be monitored.

Moreover, the number of images that the occupant monitoring device has to process simultaneously for monitoring also increases by the number of imaging devices corresponding to the number of people to be monitored.

Accordingly, in an occupant monitoring device, even if the number of people to be monitored is to be increased, it is demanded that the number of imaging devices used be minimized.

FIG. 1 illustrates an automobile 1 to which an occupant monitoring device 17 according to an embodiment of the disclosure is applied.

The automobile 1 is an example of a vehicle. The automobile 1 may be of any one of an automobile that uses an internal combustion engine as a driving power source, an automobile that uses power stored in a battery as a driving power source, and an automobile that uses a combination of the two.

The automobile 1 in FIG. 1 has an occupant compartment 2 provided with seats 3 on which occupants sit.

A steering wheel 5 protruding rearward from a dashboard 4 is disposed in front of a driver sitting on one of the seats 3.

Figure 2:
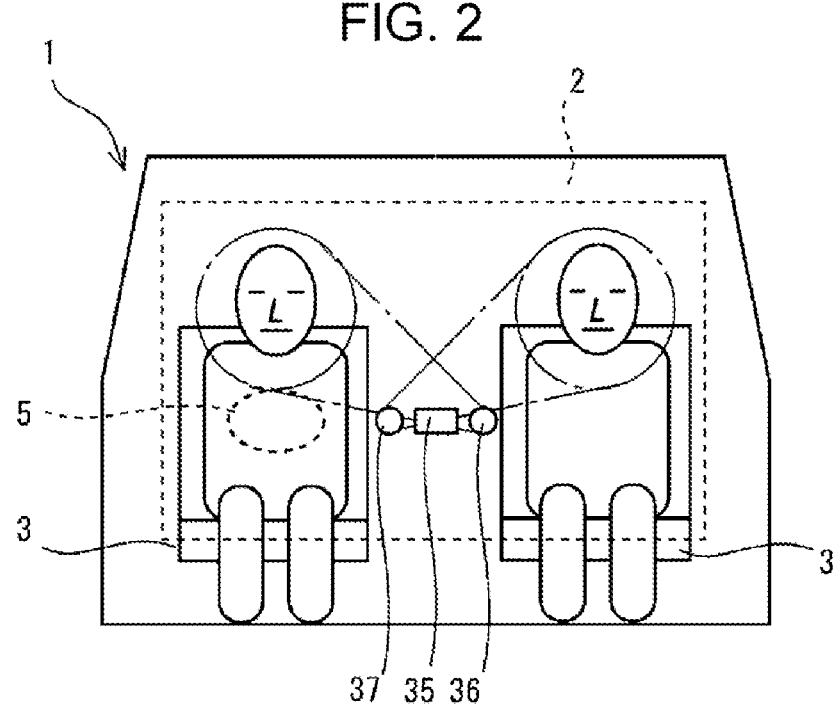
FIG. 2 illustrates a state where a driver and a passenger are sitting on two front-row seats in FIG. 1.

FIG. 2 illustrates a state where the driver and a passenger are sitting on two front-row seats 3 in FIG. 1.

In FIG. 2, the occupant compartment 2 is provided with a driver seat 3 and a passenger seat 3 disposed side-by-side in a vehicle width direction.

Figure 3:
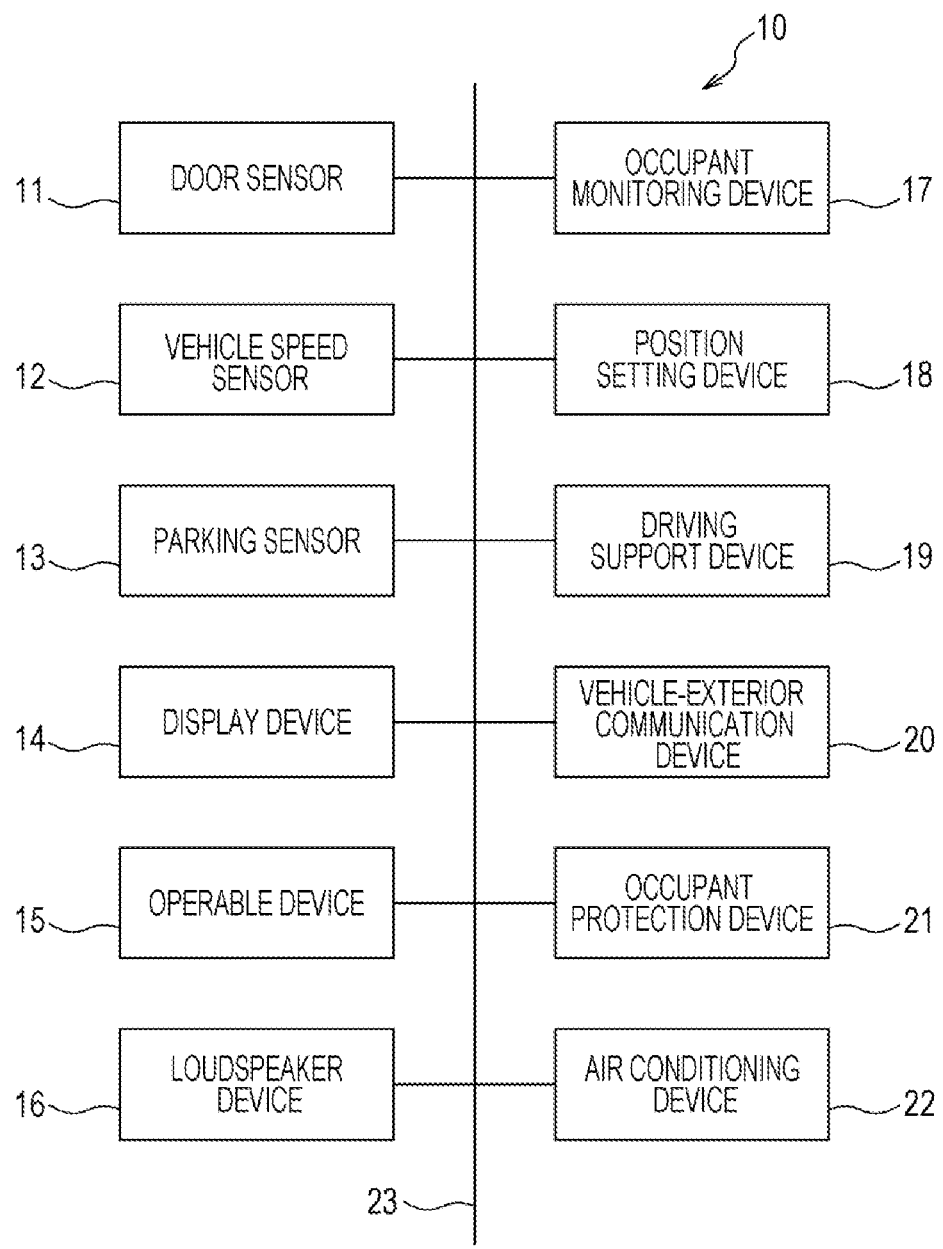
FIG. 3 illustrates a controller for the automobile in FIG. 1.

FIG. 3 illustrates a controller 10 for the automobile 1 in FIG. 1.

The controller 10 in FIG. 3 has a door sensor 11, a vehicle speed sensor 12, a parking sensor 13, a display device 14, an operable device 15, a loudspeaker device 16, the occupant monitoring device 17, a position setting device 18, a driving support device 19, a vehicle-exterior communication device 20, an occupant protection device 21, an air conditioning device 22, and a vehicle-interior network 23 that couples these devices to one another.

The vehicle-interior network 23 includes, for example, a wired communication network compliant with a controller area network (CAN), a local interconnect network (LIN), and so on. The vehicle-interior network 23 may alternatively be a wireless communication network.

The door sensor 11 detects that a door of the automobile 1 is opened from a closed state and that a door is closed from an open state.

The vehicle speed sensor 12 detects stoppage and running of the automobile 1. The vehicle speed sensor 12 may also detect the running speed of the automobile 1.

The parking sensor 13 detects a parking status in which the automobile 1 is maintained in a stopped state. A parking status can be detected when, for example, the select lever is operated to the parking position, as well as when the parking lever is pulled.

The display device 14 displays various kinds of information and images.

The operable device 15 generates operational information according to an operation performed by an occupant.

The loudspeaker device 16 outputs, for example, a speech sound and a warning sound.

The position setting device 18 adjusts, for example, the front-rear and up-down positions and the backrest angle of each seat 3, the front-rear and up-down positions and the angle of the steering wheel 5, and the front-rear and up-down positions and the angle of each kind of pedal. The position setting device 18 records setting data corresponding to occupants sitting on the seats 3 and executes control for adjusting the positions and the angles of the seats 3, the steering wheel 5, and the pedals based on the setting data. The position setting device 18 may record positional setting data in a self-driving mode separately from positional setting data in a manual driving mode, and may change the positions in accordance with the driving mode of the automobile 1.

The driving support device 19 controls the driving, stoppage, and steering of the automobile 1 so as to assist with the driving operation of the automobile 1 performed by an occupant. Moreover, the driving support device 19 may control the driving, stoppage, and steering of the automobile 1 in a fully automatic fashion.

The vehicle-exterior communication device 20 uses, for example, a public wireless communication network, a commercial wireless communication network, and so on to execute bidirectional data communication with a ground-based communication facility, a vehicle-exterior communication device of another automobile, and so on. Accordingly, the automobile 1 can acquire information related to traffic information, the running state of an automobile traveling in the vicinity, and traffic conditions surrounding the automobile 1. Moreover, the vehicle-exterior communication device 20 can transmit information about the running state of the automobile 1, such as a self-driving mode.

The occupant protection device 21 deploys an airbag and applies tension to a seatbelt in the event of a collision, so as to protect the occupant sitting on each seat 3.

The air conditioning device 22 supplies either one of cooled air and heated air to the occupant compartment 2 so as to adjust the temperature in the occupant compartment 2 to a set temperature.

The occupant monitoring device 17, for example, recognizes an occupant who has boarded the occupant compartment 2 and is sitting on the driver seat 3, and monitors whether the recognized occupant is driving inattentively, is falling asleep, and so on. If the occupant monitoring device 17 detects that the occupant is driving inattentively, is falling asleep, and so on, the occupant monitoring device 17 outputs a warning from the loudspeaker device 16 to the occupant by using a speech sound. Accordingly, the occupant is made to concentrate on driving the automobile 1, so that increased safety can be expected. Consequently, the occupant monitoring device 17 obtains information necessary for control from another device via the vehicle-interior network 23, controls another device via the vehicle-interior network 23, and so on.

The automobile 1 can accommodate not only a driver but also another occupant, such as a passenger, sitting on the corresponding seat 3.

Therefore, it is desirable that the occupant monitoring device 17 monitor another occupant, such as a passenger, in addition to the driver.

However, when a plurality of occupants are to be monitored in this manner, the occupant monitoring device 17 has to be equipped with a plurality of imaging devices 35, one for every occupant. The number of required imaging devices 35 is basically equal to the number of seat positions of the seats 3 provided in the automobile 1.

For example, when a passenger is to be monitored in addition to the driver, the occupant monitoring device 17 needs to have two imaging devices 35 corresponding to the number of people to be monitored.

Furthermore, the number of images that have to be simultaneously processed for the monitoring process performed by the occupant monitoring device 17 also increases in proportion to the number of imaging devices 35. Accordingly, it is demanded that the number of imaging devices 35 to be used be minimized even if the number of people to be monitored by the occupant monitoring device 17 is to be increased.

The following description relates to an example where the occupant monitoring device 17 monitors the driver and the passenger sitting on the seats 3 disposed side-by-side in the vehicle width direction.

Figure 4:
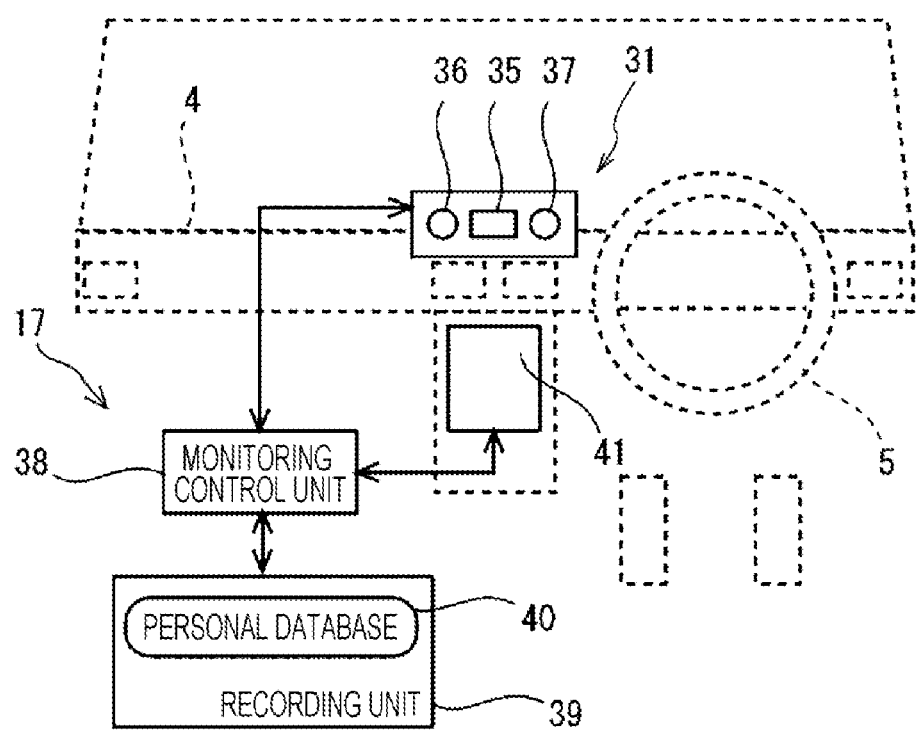
FIG. 4 illustrates the configuration of the occupant monitoring device according to the embodiment of the disclosure.

FIG. 4 illustrates the configuration of the occupant monitoring device 17 according to the embodiment of the disclosure.

The occupant monitoring device 17 in FIG. 4 includes a sensor unit 31, a monitoring control unit 38, and a recording unit 39.

Moreover, FIG. 4 also illustrates a touchscreen display device 41 disposed in a lower central region of the dashboard 4. The touchscreen display device 41 is formed by disposing the operable device 15, which is transparent, over a display screen of the display device 14.

Figure 5A:
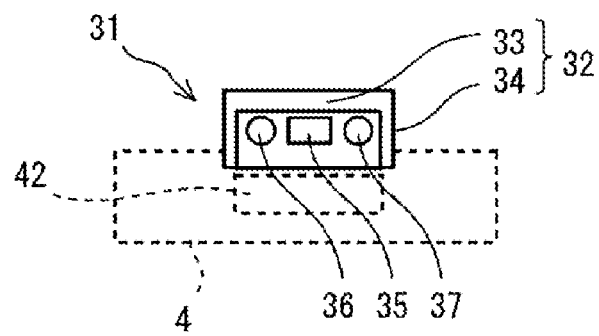
FIGS. 5A and 5B illustrate the structure and layout of a sensor unit in FIG. 4.
Figure 5B:
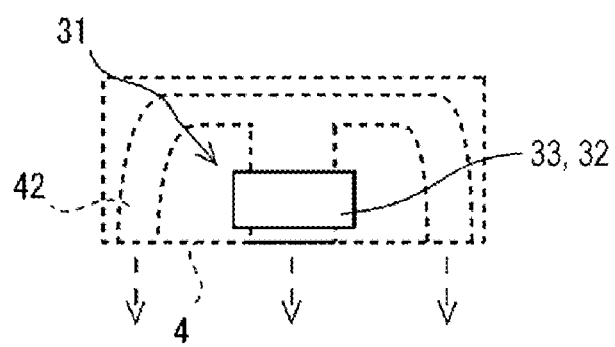

FIGS. 5A and 5B illustrate the structure and layout of the sensor unit 31 in FIG. 4.

FIG. 5A illustrates the sensor unit 31, as viewed from the rear.

FIG. 5B illustrates the sensor unit 31, as viewed from above.

The sensor unit 31 is provided in an upper central region of the dashboard 4.

The sensor unit 31 in FIGS. 5A and 5B has a cold insulation cover 32, an imaging device 35, a driver light projector 36, and a passenger light projector 37.

The cold insulation cover 32 is composed of die-cast aluminum having high thermal conductivity and has a cover 33 and a thermal conductor 34.

The cover 33 has a substantially-rectangular plate shape and covers the upper side of the imaging device 35 and the pair of light projectors 36 and 37.

The thermal conductor 34 is substantially U-shaped and extends downward from the substantially-rectangular-plate-shaped cover 33.

The lower edge of the thermal conductor 34 extends to a position lower than the imaging device 35 and the pair of light projectors 36 and 37.

Accordingly, the upper, front, and left and right sides of the imaging device 35 and the pair of light projectors 36 and 37 are covered by the cover 33 having high thermal conductivity.

Although the sensor unit 31 is provided in the upper central region of the dashboard 4, the imaging device 35 and the pair of light projectors 36 and 37 are less likely to be heated by direct sunlight from the sun.

Furthermore, an air conditioning duct 42 of the air conditioning device 22 is provided directly below the sensor unit 31. When the air conditioning device 22 is operating, the air conditioning duct 42 reaches a set temperature. According to the air conditioning duct 42, the cover 33 having high thermal conductivity is also controlled to a temperature close to the set temperature.

Therefore, even when the imaging device 35 and the pair of light projectors 36 and 37 generate heat while being exposed to direct sunlight from the sun, the imaging device 35 and the pair of light projectors 36 and 37 may be maintained at an operable temperature.

The recording unit 39 is, for example, either one of a semiconductor memory device and a hard disk device. The recording unit 39 stores a program and data to be used in the occupant monitoring device 17. For example, the recording unit 39 stores a personal database 40.

For each occupant, the personal database 40 has, for example, an identification number, a facial image for authentication, and setting information, as occupant information in the occupant monitoring device 17.

The monitoring control unit 38 is, for example, a central processing unit (CPU). The CPU loads the program from the recording unit 39 and executes the program. Accordingly, the monitoring control unit 38 is realized.

The monitoring control unit 38 identifies each occupant who has boarded the occupant compartment 2 and monitors the occupant.

The monitoring control unit 38 executes control for an occupant monitoring process based on an image captured by the imaging device 35.

Next, the imaging device 35 and the pair of light projectors 36 and 37 will be described.

Figure 6:
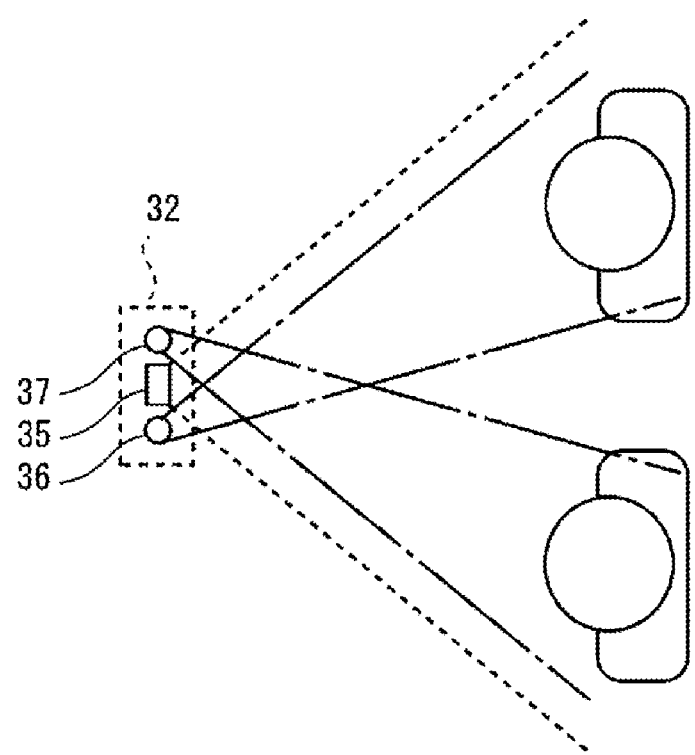
FIG. 6 schematically illustrates an imaging range of an imaging device in FIG. 4 and light projection ranges of a pair of light projectors.

FIG. 6 schematically illustrates an imaging range of the imaging device 35 in FIG. 4 and light projection ranges of the pair of light projectors 36 and 37.

Specifically, FIG. 6 illustrates the imaging range and the light projection ranges, as viewed from above. FIG. 2 illustrates the imaging range and the light projection ranges, as viewed from the front.

In FIGS. 6 and 2, the imaging range is indicated by a dashed line, and the light projection ranges are each indicated by a single-dot chain line.

The imaging device 35 captures a wide-angle image by using, for example, infrared light.

The imaging device 35 is provided in a central region of the dashboard 4 that corresponds to a central region of the occupant compartment 2 in the vehicle width direction.

As indicated by a dashed line in FIGS. 6 and 2, the imaging device 35 captures a single infrared image of the imaging range including the driver and the passenger sitting side-by-side in the vehicle width direction.

The pair of light projectors 36 and 37 each project, for example, infrared light.

The light projectors 36 and 37 have a one-to-one correspondence relationship with the driver and the passenger to be imaged in this embodiment.

As indicated by a single-dot chain line in FIGS. 6 and 2, the light projectors 36 and 37 each radiate infrared light within the light projection range toward the occupant sitting on the corresponding seat 3. The light projectors 36 and 37 may each be equipped with a condensing lens (not illustrated). Thus, as illustrated in FIG. 2, each of the light projectors 36 and 37 can radiate infrared light in a concentrated manner toward the light projection range in which the head and face of the corresponding occupant move.

The light projectors 36 and 37 consume more power and generate a larger amount of heat as the amount of output light increases. In this embodiment, the light projection ranges of the light projectors 36 and 37 are narrowed so as to be part of the imaging range, as illustrated in FIGS. 6 and 2. Accordingly, the pair of light projectors 36 and 37 can radiate strong infrared light to the heads of a plurality of occupants while consuming less power and generating a smaller amount of heat. Even in a state where the monitoring control unit 38 is exposed to strong direct sunlight, the monitoring control unit 38 can extract the feature of the head of each occupant in the image captured by the imaging device 35.

The driver light projector 36 and the passenger light projector 37 are provided together in the upper central region of the dashboard 4 so as to be disposed side-by-side in the vehicle width direction with the imaging device 35 interposed between the two light projectors.

The driver light projector 36 is disposed in the dashboard 4 at the passenger side with respect to the imaging device 35.

The passenger light projector 37 is disposed in the dashboard 4 at the driver side with respect to the imaging device 35.

Accordingly, the light projectors 36 and 37 can each radiate infrared light toward the head of the corresponding occupant to be imaged from a diagonally downward direction instead of from either one of the forward direction and the lateral direction.

The driver light projector 36, the passenger light projector 37, and the imaging device 35 are provided above, that is, in the vicinity of, the touchscreen display device 41 provided in the lower central region of the dashboard 4.

Next, occupant monitoring control performed by the monitoring control unit 38 in FIG. 4 will be described.

When the monitoring control unit 38 determines that occupants have boarded the automobile 1 based on, for example, open-close detection by the door sensor 11, the monitoring control unit 38 starts to perform an occupant monitoring process.

The monitoring control unit 38 turns on the pair of light projectors 36 and 37. Moreover, the monitoring control unit 38 causes the imaging device 35 to operate. Accordingly, the monitoring control unit 38 is capable of acquiring a captured infrared image of the driver and the passenger.

Figure 7:
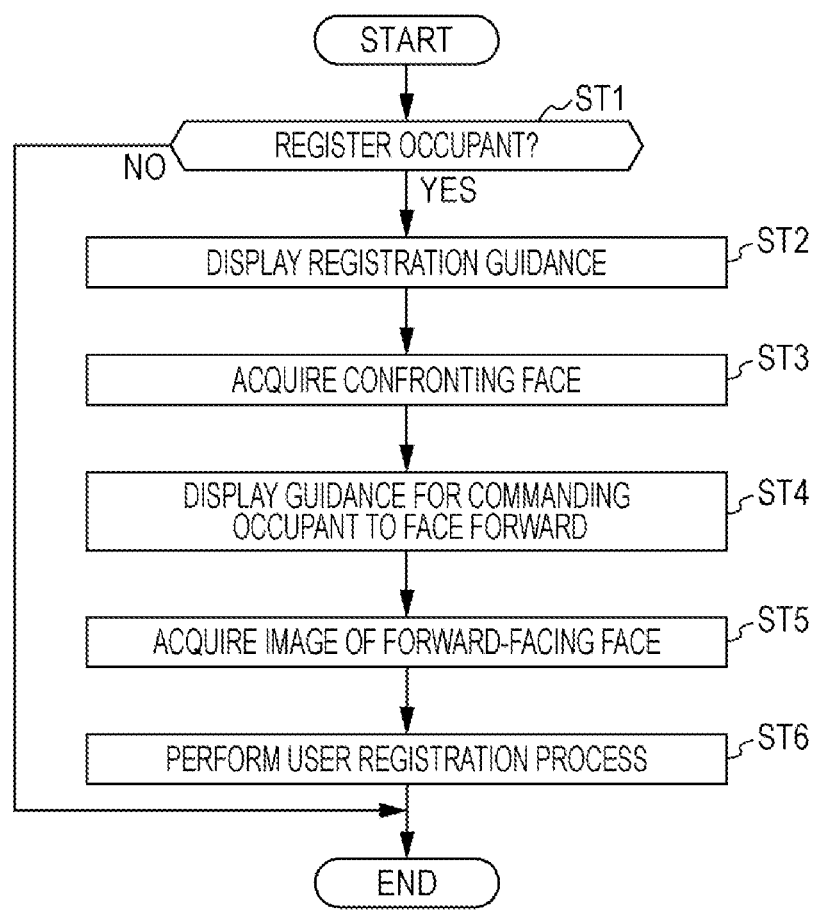
FIG. 7 is a flowchart of an occupant registration process performed by a monitoring control unit in FIG. 4.

FIG. 7 is a flowchart of an occupant registration process performed by the monitoring control unit 38 in FIG. 4.

In step ST1 in FIG. 7, the monitoring control unit 38 first determines whether to register each occupant. If the occupant is not to be registered, the monitoring control unit 38 ends the process in FIG. 7.

If the occupant is to be registered, the monitoring control unit 38 causes the touchscreen display device 41 serving as the display device 14 to display guidance to occupant registration in step ST2.

In step ST3, the monitoring control unit 38 acquires an infrared image captured by the imaging device 35 in a state where the touchscreen display device 41 displays guidance for starting the occupant registration.

By causing the touchscreen display device 41 to display the guidance for starting the occupant registration, either one of a driver and a passenger on board may check the displayed contents by turning his/her face toward the touchscreen display device 41.

Thus, the imaging device 35 disposed above, that is, in the vicinity of, the touchscreen display device 41 may capture a confronting image of the face of either one of the driver and the passenger on board.

Subsequently, in step ST4, the monitoring control unit 38 changes the display on the touchscreen display device 41 and causes the touchscreen display device 41 to display guidance for commanding each occupant to face forward.

In step ST5, the monitoring control unit 38 acquires an infrared image from the imaging device 35.

Accordingly, the imaging device 35 may capture an image of the forward-facing face of either one of the driver and the passenger.

Subsequently, in step ST6, the monitoring control unit 38 executes a user registration process.

In the user registration process, the monitoring control unit 38 clips out the confronting face and the forward-facing face as facial images of either one of the driver and the passenger from the two captured images.

Then, the monitoring control unit 38 adds the two clipped images together with a new identification number to the personal database 40. The monitoring control unit 38 may add facial feature points of each occupant included in the two clipped images to the personal database 40.

Accordingly, information about a new user is registered in the personal database 40.

Figure 8:
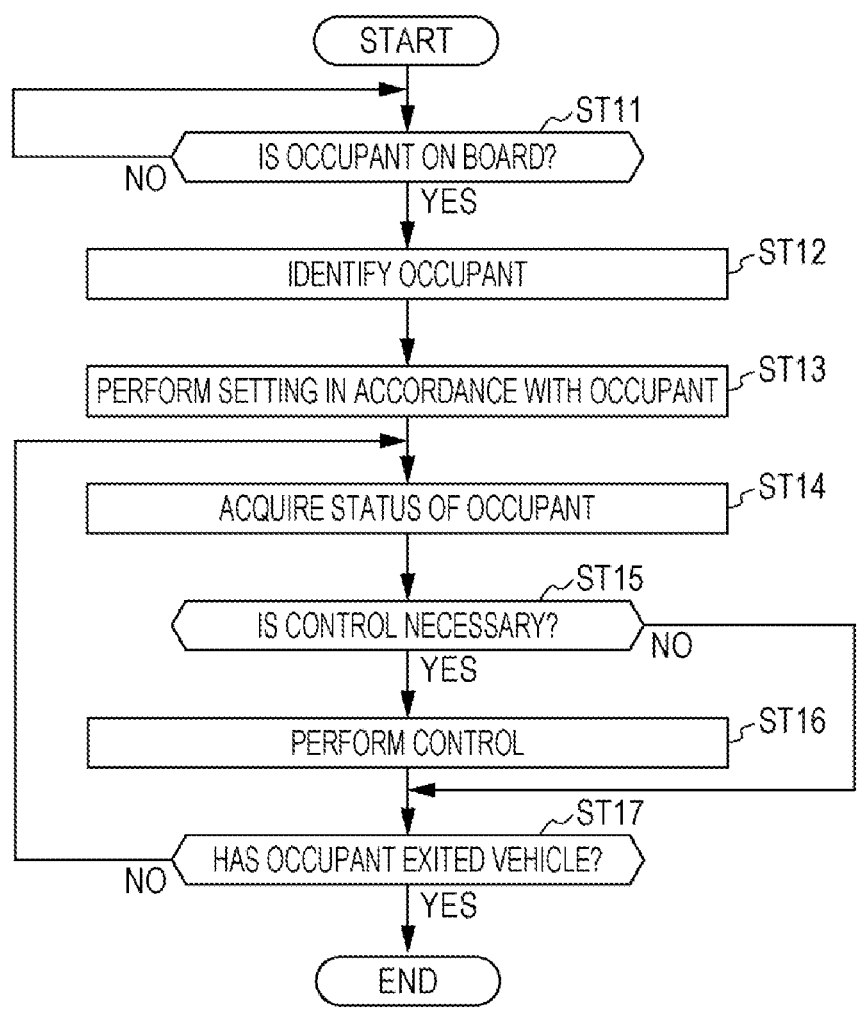
FIG. 8 is a flowchart of an occupant monitoring process performed by the monitoring control unit in FIG. 4.

FIG. 8 is a flowchart of the occupant monitoring process performed by the monitoring control unit 38 in FIG. 4.

In step ST11 in FIG. 8, the monitoring control unit 38 determines whether each occupant is on board based on, for example, open-close detection by the door sensor 11.

In step ST12, the monitoring control unit 38 identifies the occupant on board.

Specifically, the monitoring control unit 38 identifies the occupant on board by acquiring a new captured image from the imaging device 35 and comparing the acquired image with facial images registered in the personal database 40.

In the comparison process, for example, the monitoring control unit 38 compares the acquired image with all facial images registered in the personal database 40, specifies a facial image with the highest matching evaluation value, and specifies a user corresponding to the specified image in the personal database 40.

Specifically, the monitoring control unit 38 identifies and specifies each occupant based on a facial image facing toward the imaging device 35 and a facial image facing forward of the automobile 1.

The facial image facing forward of the automobile 1 is captured from a diagonally lateral direction.

In contrast, a confronting facial image facing toward the imaging device 35 is captured from the front and tends to have feature points caused by protrusions and depressions, such as the nose, appearing in the image.

Therefore, in the comparison process, the monitoring control unit 38 may prioritize the forward-facing face over the confronting image.

Furthermore, the monitoring control unit 38 may compare the feature points extracted from the two images instead of directly comparing the two images with each other.

In step ST13, the monitoring control unit 38 executes setting control in accordance with the identified occupant.

The monitoring control unit 38 executes various kinds of setting control based on a set value registered in correspondence with the identified occupant in the personal database 40.

For example, the monitoring control unit 38 reports a seat-position set value registered in the personal database 40 to the position setting device 18. The position setting device 18 controls each seat 3 to the position according to the reported set value.

In step ST14, the monitoring control unit 38 starts to monitor the occupants. The monitoring control unit 38 acquires the images captured by the imaging device 35 so as to acquire the current status of each occupant.

Based on one of the images captured by the imaging device 35, the monitoring control unit 38 acquires the current status of the driver and the passenger identified as being on board.

For example, the monitoring control unit 38 extracts feature points from the current images and compares the extracted feature points with feature points obtained from the image of each identified occupant, so as to acquire the current status, such as the orientation of the occupant's face and the degree of opening of the occupant's eyes.

In step ST15, the monitoring control unit 38 determines whether control is necessary. If control is not necessary, the monitoring control unit 38 advances the process to step ST17.

If control is necessary, the monitoring control unit 38 executes the necessary control in step ST16.

For example, if the driver's face is facing downward in the running vehicle, the monitoring control unit 38 determines that occupant notification control is necessary. The monitoring control unit 38 outputs an attention-attracting sound from the loudspeaker device 16.

Alternatively, for example, when the monitoring control unit 38 acquires a status in which a child seat is attached to the passenger seat 3 in step ST14, the monitoring control unit 38 executes control for not deploying the airbag toward the passenger seat 3. Under the control of the monitoring control unit 38, the occupant protection device 21 executes a setting process for not deploying the airbag toward the passenger seat 3.

In step ST17, the monitoring control unit 38 determines whether the occupants have exited the automobile 1 and monitoring is thus not necessary.

If the occupants have not exited the automobile 1 and monitoring is still necessary, the monitoring control unit 38 returns the process to step ST14. Accordingly, the monitoring control unit 38 continues to perform the occupant monitoring process.

If the occupants have exited the automobile 1 and monitoring is thus not necessary, the monitoring control unit 38 ends the process in FIG. 8.

Accordingly, the occupant monitoring device 17 according to this embodiment uses the single imaging device 35 to capture an image of a driver and a passenger sitting side-by-side in the vehicle width direction. Thus, in this embodiment, the monitoring process can be performed using the single imaging device 35, regardless of the fact that the number of people to be monitored is two. In the occupant monitoring device 17, the imaging device 35 does not have to be provided for every occupant. Therefore, even if the number of people to be monitored is to be increased, the number of imaging devices to be used can be minimized. In addition, the imaging device 35 is provided in the central region of the dashboard 4 in the occupant compartment 2 in the vehicle width direction. Consequently, the imaging device 35 can capture a single infrared image of the driver and the passenger sitting side-by-side in the vehicle width direction while the driver and the passenger are favorably separated from each other in the image. Moreover, the monitoring control unit 38 that executes control for the occupant monitoring process can perform monitoring control with respect to the driver and the passenger sitting side-by-side in the vehicle width direction based on the single infrared image captured by the imaging device 35. In contrast, supposing that, for example, an imaging device 35 is to be provided in front of each occupant, it is necessary to provide the occupant monitoring device 17 with an imaging device 35 for every occupant. In addition, if an imaging device 35 is to be provided in front of each occupant, there is a possibility that eyes reflected on eyeglasses may be captured together in an overlapping manner with the actual eyes of the occupant. Such imaging is less likely to occur in this embodiment.

Furthermore, in this embodiment, the two light projectors 36 and 37 have a one-to-one correspondence relationship with the driver and the passenger sitting side-by-side in the vehicle width direction. The light projectors 36 and 37 are provided for the respective occupants and individually project light toward the corresponding occupants instead of projecting light entirely toward the two occupants sitting side-by-side in the vehicle width direction. Thus, the light projectors 36 and 37 do not have to project infrared light entirely toward a plurality of occupants sitting side-by-side in the vehicle width direction. As a result, even if the number of people to be monitored is to be increased, the number of light projectors 36 and 37 to be used can be minimized. In addition, each of the light projectors 36 and 37 projects light toward the head of the corresponding occupant. In this embodiment, the range in which infrared light is radiated by each of the light projectors 36 and 37 is suppressed to a minimal range necessary for performing the occupant monitoring process. In this embodiment, light can be projected economically and efficiently toward a plurality of occupants while using a minimal amount of light. In this embodiment, light can be projected efficiently toward the two occupants while using a small total amount of light, as compared with a case where light is projected entirely toward the two occupants. This can reduce the load on the automobile 1 caused by light projection. Furthermore, because the light is projected from below toward the individual faces of the occupants to be imaged, the imaging device 35 can capture the protrusions and depressions on the face of each occupant, even when the occupant receives strong sunlight, the brightness rapidly changes while the automobile 1 is moving, and so on.

Furthermore, in this embodiment, the light projectors 36 and 37 are each provided in a diagonal direction, which is close to the lateral direction, relative to the seat position of the corresponding occupant receiving the light. In particular, the driver light projector 36 is disposed in the dashboard 4 at the passenger side, which is the opposite side, with respect to the imaging device 35, and the passenger light projector 37 is disposed in the dashboard 4 at the driver side, which is the opposite side, with respect to the imaging device 35. As compared with a case where the light projectors 36 and 37 are provided at opposite side surfaces of the automobile 1 with respect to the occupants to be imaged, the light projectors 36 and 37 are disposed closer to the occupants to be imaged, so that the light projection distance to each occupant can be reduced. The light from the light projectors 36 and 37 can be efficiently radiated onto the occupants while suppressing scattering of the light occurring more as the distances from the light projectors 36 and 37 to the occupants increase. In addition, the light projectors 36 and 37 are provided at opposite sides of the occupants to be imaged with reference to the imaging device 35 on the dashboard 4. Consequently, the light projectors 36 and 37 can each ensure a diagonal light projection angle relative to the corresponding occupant. The light from each of the light projectors 36 and 37 is prevented from being blocked by a component disposed in front of each occupant, such as the steering wheel 5, and by occupant's arms that manipulate the steering wheel 5, thereby reaching the head of the occupant. In addition, the infrared light can reach the entire face. As a result, the imaging device 35 can capture an image including infrared light reflected by the entire face and clearly expressing the protrusions and depressions and the feature of the entire face.

Furthermore, in this embodiment, the driver light projector 36 and the passenger light projector 37 are provided together in the upper central region of the dashboard 4 so as to be disposed side-by-side in the vehicle width direction with the imaging device 35 interposed between the two light projectors. Therefore, even when the face of an occupant is facing downward, an image of the downward-facing face can be captured from a direction close to the forward direction. An image expressing the feature of the face, including the eyes, can be clearly captured, as compared with an image of the head captured from the front without any angles. Moreover, in a case where an occupant is wearing eyeglasses or sunglasses, there is a high possibility that an image of at least one of the left and right eyes can be captured in accordance with a difference in visual angles between the left and right eyes from the imaging device 35. Furthermore, an image of the entire face can be captured, as compared with a case where an image of the head is captured from a lateral position.

Furthermore, in this embodiment, the driver light projector 36, the passenger light projector 37, and the imaging device 35 are provided in the central region of the dashboard 4 above, that is, in the vicinity of, either one of the display device 14 and the operable device 15. Thus, the pair of light projectors 36 and 37 and the imaging device 35 can project light toward and capture an image of the front face of each occupant viewing either one of the display device 14 and the operable device 15 in the central region of the dashboard 4.

In addition, in this embodiment, the upper side of the pair of light projectors 36 and 37 and the imaging device 35 is covered by the cover 33, which is thick, of the cold insulation cover 32. Thus, the pair of light projectors 36 and 37 and the imaging device 35 are less likely to be affected by direct sunlight, regardless of the fact that the pair of light projectors 36 and 37 and the imaging device 35 are provided in the upper central region of the dashboard 4 that is exposed to direct sunlight. Moreover, the air conditioning duct 42 is provided below the pair of light projectors 36 and 37 and the imaging device 35. Furthermore, the cold insulation cover 32 has the thermal conductor 34 extending to a position lower than these devices, and the lower edge of the thermal conductor 34 is located near the air conditioning duct 42. The entire cold insulation cover 32 can be cooled by cold air from the air conditioning duct 42. Thus, even when the pair of light projectors 36 and 37 and the imaging device 35 all operate continuously over a long period of time, the temperature thereof can be maintained at either one the air conditioning temperature of the air conditioning duct 42 and a temperature close to the air conditioning temperature. Even if the imaging device 35 is disposed at a position where it may be affected by the heat generated by the pair of the light projectors 36 and 37, an image captured by the imaging device 35 is less likely to be distorted by, for example, thermal runaway.

In this embodiment, the monitoring control unit 38 that monitors occupants and performs control based on an image captured by the imaging device 35 identifies each occupant based on a facial image facing toward the imaging device 35 and a facial image facing forward of the automobile 1. Thus, as compared with a case where each occupant is identified based on only one of these two kinds of images, each occupant can be identified more reliably in this embodiment. Even if the monitoring control unit 38 identifies each occupant based on a matching evaluation value with reference to an image of the occupant, the monitoring control unit 38 can still identify the occupant with high accuracy.

Although a preferred embodiment of the disclosure has been described above, the disclosure is not limited to the above embodiment, and various modifications and alterations are permissible so long as they do not depart from the scope of the disclosure.

In the above embodiment, the occupant monitoring device 17 performs the monitoring process by using the single imaging device 35 to capture an image of a driver and a passenger sitting on the front-row seats 3 in the occupant compartment 2.

Alternatively, for example, by using the single image captured by the imaging device 35, the occupant monitoring device 17 may monitor another occupant sitting on a rear-row seat 3 in the occupant compartment 2.

Moreover, the occupant monitoring device 17 may perform the monitoring process by using another imaging device to capture an image of an occupant located at a blind spot for the imaging device 35 on the dashboard 4.

In the above embodiment, the light projectors 36 and 37 individually project light onto the heads of a plurality of occupants to be monitored.

Alternatively, for example, the light projectors 36 and 37 may each radiate infrared light onto at least the head in a range extending from the head to the chest of each of the plurality of occupants to be monitored. Even in this case, the irradiation range can be reduced, as compared with a case where the plurality of occupants are entirely irradiated with light, so that the light projectors 36 and 37 can efficiently project light.

The invention claimed is:

1. An occupant monitoring device for a vehicle in which an occupant sits on a seat provided in an occupant compartment, the occupant monitoring device comprising:
   an imaging device configured to capture an image of a plurality of occupants including a driver and a passenger that sit side-by-side in a vehicle width direction; and
   a plurality of light projectors provided in correspondence with a plurality of seat positions of the seat and configured to project light toward the seated plurality of occupants, wherein
      the plurality of light projectors includes a driver light projector and a passenger light projector,
      the driver light projector is configured to project light on a position corresponding to the driver of the vehicle,
      the passenger light projector is configured to project light on a position corresponding to the passenger of the vehicle,
      the imaging device is between the driver light projector and the passenger light projector in the vehicle width direction, and
      the imaging device is adjacent to the driver light projector and the passenger light projector.

2. The occupant monitoring device according to claim 1, wherein the imaging device is disposed in a central region in the vehicle width direction in the occupant compartment and is configured to capture a single image of the plurality of occupants sitting side-by-side in the vehicle width direction.

3. The occupant monitoring device according to claim 1, wherein the plurality of light projectors is configured to project light toward at least heads of the plurality of occupants.

4. The occupant monitoring device according to claim 2, wherein the plurality of light projectors is configured to project light toward at least heads of the plurality of occupants.

5. The occupant monitoring device according to claim 1, wherein the seat provided in the occupant compartment comprises a driver seat and a passenger seat disposed side-by-side in the vehicle width direction, and
   wherein the imaging device is provided in a central region of a dashboard provided in the occupant compartment and is configured to acquire a single image of the driver and the passenger sitting side-by-side in the vehicle width direction.

6. The occupant monitoring device according to claim 2, wherein the seat provided in the occupant compartment comprises a driver seat and a passenger seat disposed side-by-side in the vehicle width direction, and
   wherein the imaging device is provided in a central region of a dashboard provided in the occupant compartment and is configured to acquire a single image of the driver and the passenger sitting side-by-side in the vehicle width direction.

7. The occupant monitoring device according to claim 1, wherein the driver light projector is configured to project light on the position corresponding to the driver, and not to project light on the position corresponding to the passenger,
   wherein the passenger light projector is configured to project light on the position corresponding to the passenger, and not to project light on the position corresponding to the driver,
   wherein the driver light projector is at a passenger side with respect to the imaging device, and
   wherein the passenger light projector is at a driver side with respect to the imaging device.

8. The occupant monitoring device according to claim 7, wherein the driver light projector is provided in a dashboard that is provided in the occupant compartment, and
   wherein the passenger light projector is provided in the dashboard.

9. The occupant monitoring device according to claim 7, wherein the driver light projector and the passenger light projector are provided together in an upper central region of a dashboard that is provided in the occupant compartment.

10. The occupant monitoring device according to claim 1, wherein the driver light projector, the passenger light projector, and the imaging device are provided in a vicinity of either one of a display device and an operable device provided in a dashboard that is provided in the occupant compartment.

11. The occupant monitoring device according to claim 7, wherein the driver light projector, the passenger light projector, and the imaging device are provided in a vicinity of either one of a display device and an operable device provided in a dashboard that is provided in the occupant compartment.

12. The occupant monitoring device according to claim 1, wherein an air conditioning duct is provided below the driver light projector, the passenger light projector, and the imaging device.

13. The occupant monitoring device according to claim 7, wherein an air conditioning duct is provided below the driver light projector, the passenger light projector, and the imaging device.

14. The occupant monitoring device according to claim 1, further comprising:
   a control unit configured to execute control for an occupant monitoring process based on the image captured by the imaging device,
   wherein the control unit is configured to execute monitoring control with respect to the plurality of occupants sitting side-by-side in the vehicle width direction based on a single image captured by the imaging device.

15. The occupant monitoring device according to claim 2, further comprising:
   a control unit configured to execute control for an occupant monitoring process based on the image captured by the imaging device,
   wherein the control unit is configured to execute monitoring control with respect to the plurality of occupants sitting side-by-side in the vehicle width direction based on the single image captured by the imaging device.

16. The occupant monitoring device according to claim 14,
   wherein the control unit identifies each occupant of the plurality of occupants based on a facial image facing toward the imaging device and a facial image facing forward of the vehicle.

17. The occupant monitoring device according to claim 1, further comprising:
   circuitry configured to execute control for an occupant monitoring process based on the image captured by the imaging device,
   wherein the circuitry is configured to execute monitoring control with respect to the plurality of occupants sitting side-by-side in the vehicle width direction based on a single image captured by the imaging device.

18. The occupant monitoring device according to claim 1, wherein the driver light projector and the passenger light projector are configured such that, in a view from above in the vehicle, when the driver light projector and the passenger light projector project light, a light projection range of the driver light projector intersects with a light projection range of the passenger light projector in a region between the driver light projector and the driver of the vehicle.

19. An occupant monitoring device for a vehicle in which an occupant sits on a seat provided in an occupant compartment, the occupant monitoring device comprising:
   an imaging device configured to capture an image of a plurality of occupants including a driver and a passenger that sit side-by-side in a vehicle width direction; and
   a plurality of light projectors provided in correspondence with a plurality of seat positions of the seat and configured to project light toward the seated plurality of occupants, wherein
      the plurality of light projectors includes a driver light projector and a passenger light projector,
      the driver light projector is configured to project light on a position corresponding to the driver of the vehicle,
      the passenger light projector is configured to project light on a position corresponding to the passenger of the vehicle,
      the imaging device is between the driver light projector and the passenger light projector in the vehicle width direction, and
      the driver light projector and the passenger light projector are configured such that, in a view from above in the vehicle, when the driver light projector and the passenger light projector project light, a light projection range of the driver light projector intersects with a light projection range of the passenger light projector in a region between the driver light projector and the driver of the vehicle.

20. The occupant monitoring device according to claim 19,
   wherein the driver light projector is configured to project light on the position corresponding to the driver, and not to project light on the position corresponding to the passenger, and
   wherein the passenger light projector is configured to project light on the position corresponding to the passenger, and not to project light on the position corresponding to the driver.

* * * * *